United States Patent [19]

Peppel et al.

[11] Patent Number: 4,984,827
[45] Date of Patent: Jan. 15, 1991

[54] CONCENTRIC PIPING FLEX JOINT

[75] Inventors: George W. Peppel, Arlington; Paul E. Sullivan, Bedford, both of Tex.

[73] Assignee: Lockheed Corporation, Burbank, Calif.

[21] Appl. No.: 237,502

[22] Filed: Aug. 26, 1988

Related U.S. Application Data

[62] Division of Ser. No. 9,255, Jan. 30, 1987, Pat. No. 4,789,410.

[51] Int. Cl.⁵ .............................................. F16L 47/00
[52] U.S. Cl. .................................. 285/133.1; 285/167; 285/223; 285/234; 285/263
[58] Field of Search ...................... 285/263, 223, 133.1, 285/134, 135, 167, 137.1, 234, 138

[56] References Cited

U.S. PATENT DOCUMENTS

| | | | |
|---|---|---|---|
| 3,678,810 | 7/1972 | Holmes et al. | 285/135 X |
| 4,068,864 | 1/1978 | Herbert et al. | 285/167 X |
| 4,068,868 | 1/1978 | Ohrt | 285/223 X |
| 4,416,473 | 11/1983 | Lamy | 285/223 X |
| 4,515,399 | 5/1985 | Sullivan et al. | 285/167 X |
| 4,570,979 | 2/1986 | Moore | 285/223 |
| 4,593,941 | 6/1986 | Whightsil | 285/167 X |

FOREIGN PATENT DOCUMENTS

| | | | |
|---|---|---|---|
| 246520 | 10/1947 | Switzerland | 285/134 |
| 391344 | 7/1973 | U.S.S.R. | 285/137.1 |
| 653987 | 5/1951 | United Kingdom | 285/135 |
| 1442690 | 7/1976 | United Kingdom | 285/134 |

Primary Examiner—Dave W. Arola
Attorney, Agent, or Firm—Richards, Medlock & Andrews

[57] ABSTRACT

Several versions of a flex joint (10, 100, 200) are provided which provides for relative flexible movement between a first member and a second member about a pivot point. The pivotal motion is provided by the use of elastomeric assemblies which are placed in elastomeric shear as one member pivots relative to the other. With each of the flex joints, at least two concentric and separate passages are formed through the flex joint for carrying fluids and the like through the flex joint. The passages remain separate and essentially unchanging in cross-section throughout the entire range of pivotal motion of the flex joint.

5 Claims, 3 Drawing Sheets

CONCENTRIC PIPING FLEX JOINT

This is a divisional of co-pending application Ser. No. 009,255 filed on Jan. 30, 1987 and now U.S. Pat. No. 4,784,410 issued on Nov. 15, 1988.

TECHNICAL FIELD

This invention relates to a piping joint for use in flexibly connecting pipes for offshore use.

BACKGROUND OF THE INVENTION

In offshore drilling and production, there is often a need to provide piping extending from the sea floor to the surface where the drilling or production platform is positioned. This piping can act as a tension leg for supporting the platform, a conduit for drilling or production, a conduit for providing pressurized fluids for control functions to a sea floor unit from the platform, or any combination of these functions.

A critical consideration in such pipe construction is the movement of the platform relative to the sea floor. In the past, expensive flexible pipes have been rigidly mounted at the sea floor to extend to the platform to accommodate this motion. If a fluid passage is necessary in such a pipe, in the past, concentric flexible pipes have been employed. However, as these flexible pipes move, the annular area between the pipes defining the passage varies in cross-sectional area.

A need exists for an improved technique for connecting sea floor equipment with a surface platform while providing for one or more passages through the pipe for communication between the platform and sea floor equipment.

SUMMARY OF THE INVENTION

In accordance with one aspect of the present invention, a flex joint is provided having first and second rigid pipe connectors. Structure, including elastomeric elements, connect the first and second rigid pipe connectors together and accommodates movement between the connectors relative to a pivot point by shear in the elastomeric elements.

In accordance with another aspect of the present invention, two passages are formed through the connectors.

In accordance with yet another aspect of the present invention, the elastomeric elements are formed of alternating layers of rigid material and elastomeric material, each layer of rigid material being semi-spherical and centered on the pivot point.

BRIEF DESCRIPTION OF THE DRAWINGS

For a more complete understanding of the present invention and for further advantages thereof, reference is now made to the following Detailed Description taken in conjunction with the accompanying Drawings, in which.

DETAILED DESCRIPTION

Figure 1:
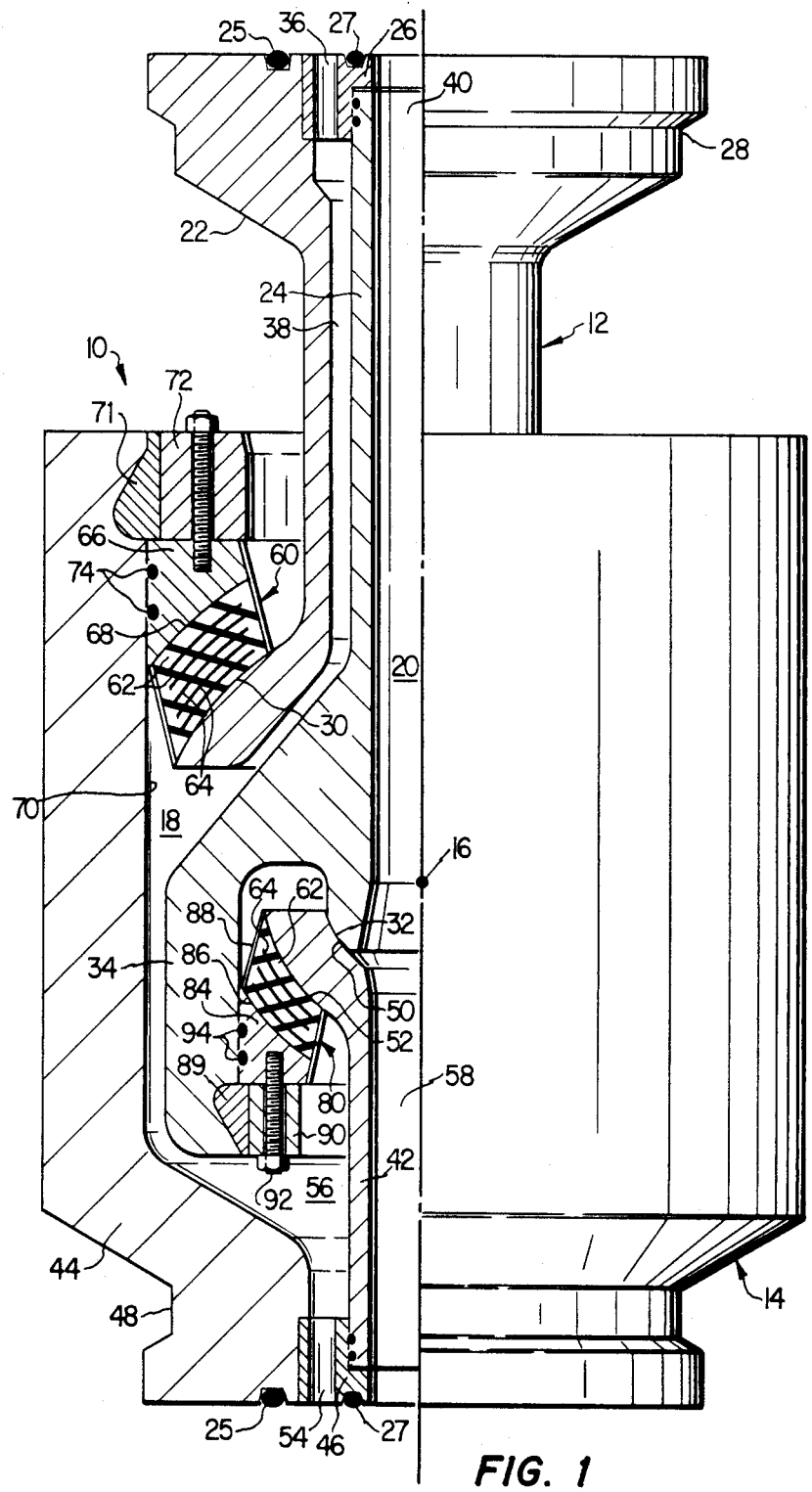
FIG. 1 is a partial cross-sectional view of a first embodiment of the present invention.

With reference now to the accompany, Drawings wherein like reference numerals designate corresponding parts throughout the several views, FIG. 1 illustrates a flex joint 10 forming a first embodiment of the present invention. A first rigid pipe connector 12 and a second rigid pipe connector 14 are assembled together with a number of elastomeric assemblies to permit the connectors 12 and 14 to pivot relative each other about a pivot point 16. Two continuous passages, passage 18 and passage 20, are formed through the flex joint 10 and are maintained as separate passages by the construction of the flex joint as will be described in greater detail hereinafter. As the flex joint moves through its range of motion, these passages remain essentially uniform in cross-section and can be used to carry pressurized control fluids, etc.

The first rigid pipe connector 12 comprises an outer member 22, an inner member 24 and a connecting ring 26. The first rigid pipe connector 12 is designed for attachment to a rigid pipe leading to the platform at the surface, or, in the alternative, to sea floor mounted equipment.

The outer member 22 can be seen to have a clamping section 28 on its exposed end for clamping to an element (not shown). Outer member 22 also defines a spherical bearing surface 30 on its inner end which is centered on the pivot point 16.

The inner member 24 defines a spherical bearing surface 32 which is also centered on the pivot point 16. Inner member 24 also defines an arm 34 extending around bearing surface 32.

The connecting ring 26 secures the outer member 22 and inner member 24 in a concentric orientation with their axis of symmetry coincident. Passage 36 through the connecting ring 26 opens into the annular passage 38 between the members 22 and 24 to define a portion of the continuous passage 18. The inner member 24 has a passage 40 which defines a portion of the continuous passage 20.

The second rigid pipe connector 14 is similarly constructed of an inner member 42 and an outer member 44 with a connecting ring 46 therebetween. The outer member 44 is configured for mounting to a structure (not shown) by a clamp received in notch 48. The inner member 42 defines a spherical inner bearing surface 50 and a spherical outer bearing surface 52, both centered on the pivot point 16. The connecting ring 46 is received between the inner and outer members to position them concentrically, with their axis of symmetry coincident. The connecting ring has a passage 54 formed therethrough which opens into an annular passage 56 between the inner and outer members. Passages 54 and 56 also form a portion of the continuous passage 18. The inner member 42 defines a passage 58 which forms a portion of the continuous passage 20.

An outer elastomeric bearing assembly 60 is mounted between the outer member 22 and outer member 44, as shown in FIG. 1. The elastomeric bearing assembly 60 is formed of alternating layers of elastomeric material 62 and rigid plates 64. The rigid plates 64 are curved with their center of curvature coincident with the pivot point 16. The inner side of bearing assembly 60 is preferably bonded on the spherical bearing surface 30 of the outer member 22. The outer surface of the bearing assembly is bonded to a ring 66 at spherical bearing surface 68 on the ring. Ring 66 is secured along the inner cylindrical surface 70 of outer member 44 by a locking ring 72 at the end of outer member 44. Preferably, O-rings 74 seal between the ring 66 and the inner cylindrical surface 70.

An inner elastomeric bearing assembly 80 is positioned between inner member 24 and inner member 42. Again, the inner elastomeric bearing assembly 80 is formed of alternating layers of elastomeric material 62 and rigid plates 64. The rigid plates 64 are curved with their radius of curvature coinciding with pivot point 16. The innerface of the bearing assembly 80 is preferably bonded to the spherical outer bearing surface 52 of inner member 42. The outer face of elastomeric bearing assembly 80 is bonded to a ring 84 at spherical bearing surface 86 of the ring. Spherical bearing surface 86 is concentric about pivot point 16 as well. The ring 84 is rigidly mounted to the arm 34 by locking ring 90. Bolts 92 pass through the locking ring 90 to bolt the ring thereto. O-rings 94 are provided between the outer surface of ring 84 and the inner cylindrical surface 88 to provide a seal.

As can be readily understood, the first and second rigid pipe connectors can pivot relative to each other about the pivot point 16 by placing the elastomeric bearing assemblies 60 and 80 into shear. In addition, the configuration of the flex joint provides continuous passages 18 and 20 through the flex joint which do not vary significantly in cross-section as the joint flexes. The connectors are capable of transferring both tension and compression forces as one the elastomers bearing assemblies will always be in compression to transfer the forces.

Figure 2:
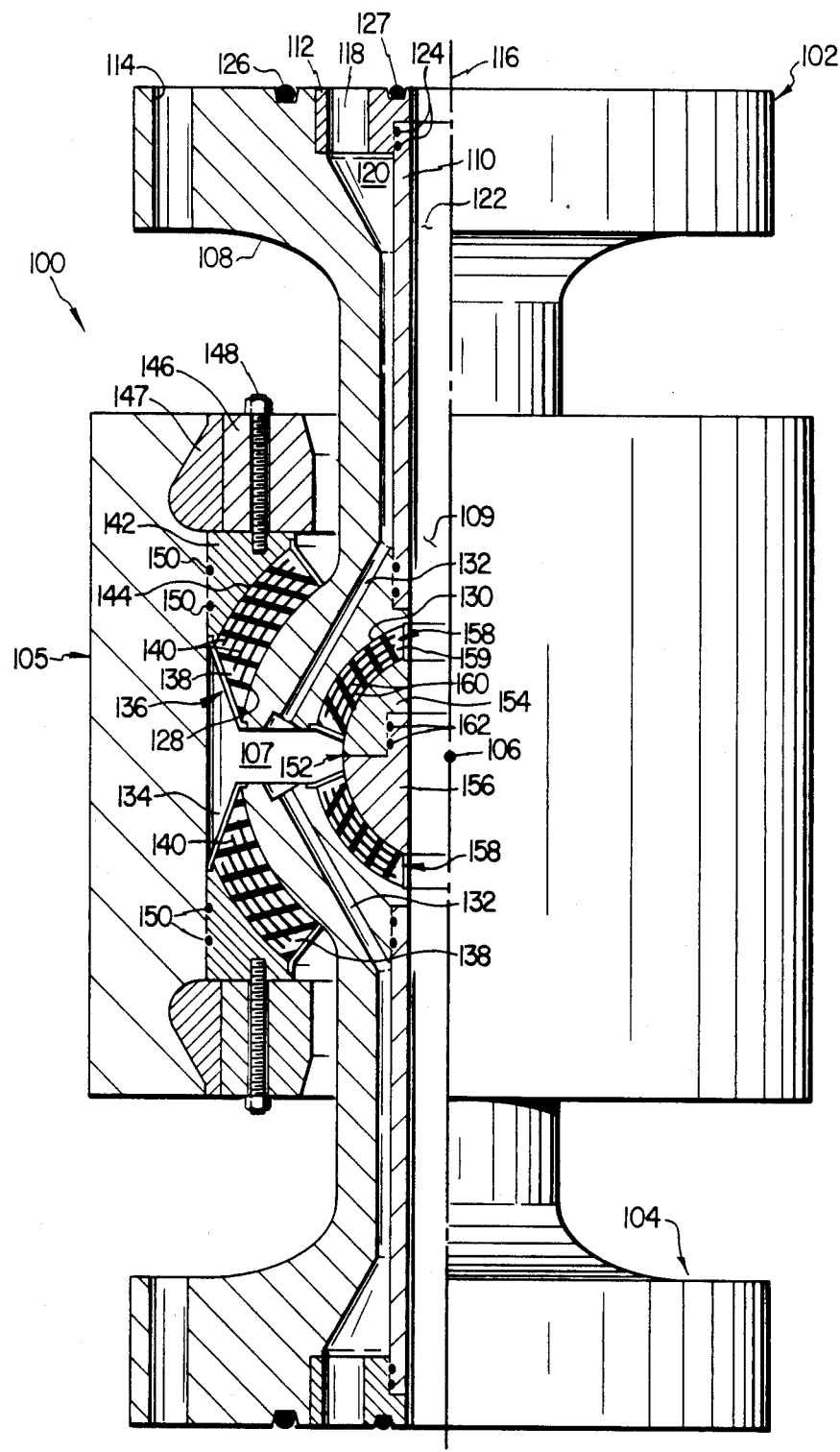
FIG. 2 is a partial cross-sectional view of a second embodiment of the present invention.

With reference now to FIG. 2, a second embodiment of the present invention is illustrated which forms a flex joint 100. The flex joint 100 includes a first rigid pipe connector 102, a second rigid pipe connector 104 and cylinder 105. The joint 100 provides for pivotal motion between the pipe connectors 102 and 104 about a pivot point 106 in a manner similar to flex joint 10. Continuous passages 107 and 109 are formed through the flex joint 100 for passage of fluids.

The first rigid pipe connector 102 is formed of an outer member 108, an inner member 110 and a connecting ring 112. As can be seen, outer member 108 has bolt holes 114 for bolting the connector 102 to piping or other equipment (not shown). The connecting ring 112 secures the inner and outer members concentric about their joint axis of symmetry 116. The connecting ring 112 has a passage 118 formed therethrough which opens into the annular passage 120 formed between the inner and outer members. Passages 118 and 120 each form a portion of continuous passage 107. The inner member itself defines a passage 122 therealong which forms a portion of passage 109. O-rings 124 seal between ring 112 and the inner member 110 to isolate the passage 120 from the passage 122. O-rings 126 on the exposed face of outer member 108 and ring 112 provide for sealing to the equipment to which the connector is secured.

The outer member 108 is provided with an outer spherical surface 128 and an inner spherical surface 130, each centered about the pivot point 106. A series of ports 132 pass through the outer member between the surfaces 128 and 130. The ports 132 are connected at one end to the annular passage 120 and open through the inner end of the outer member 108 within cavity 134.

An outer bearing assembly 136 is provided between the outer member 108 and cylinder 105. The bearing assembly 136 is formed of alternating layers of elastomeric material 138 and rigid plates 140. Each of the rigid plates 140 is curved with its center of curvature coincident with the pivot point 106. The inner surface of bearing assembly 136 is bonded to the outer spherical surface 128 of the outer member 108. The outer surface of the bearing assembly 136 is bonded to ring 142 at spherical bearing surface 144 on the ring. The spherical bearing surface 144 is similarly centered on the pivot point 106. The ring 142 is rigidly secured to the cylinder 105 by locking ring 146. Bolts 148 secure the ring to the locking ring 146. O-rings 150 provide for a fluid-tight seal between the inner cylindrical surface of the cylinder 105 and the ring 142.

A spherical ball 152, formed of section 154 and section 156 is provided between the first and second pipe connectors 102 and 104. The section 154 is bonded to the outer member 108 through an inner bearing assembly 158. The inner bearing assembly 158 also comprises alternating layers of elastomeric material 138 and rigid plates 140. The rigid plates 140 are also curved with their center of curvature coincident with the pivot joint 106. The outer surface of the inner bearing assembly 158 is bonded to the inner spherical surface 130 of outer member 108. The spherical ball 152 is formed in two sections so that the first and second connectors 102 and 104 can be separated. When sections 154 and 156 are interlocked, O-rings 162 provide a seal which isolates the continuous passage 107 from the continuous passage 109.

The second rigid pipe connector 104 is constructed essentially identical to the first rigid pipe connector 102. Preferably, the pipe connectors are interchangeable to reduce the cost of the flex joint.

As can be readily understood, the first and second rigid pipe connectors 102 and 104 can pivot relative to each other about the pivot point 106 by placing the elastomeric material in bearing assemblies 136 and 158 in shear. In addition, the continuous passages 107 and 109 remain separate and of generally uniform cross-section through the entire range of motion between the first and second pipe connectors.

Figure 3:
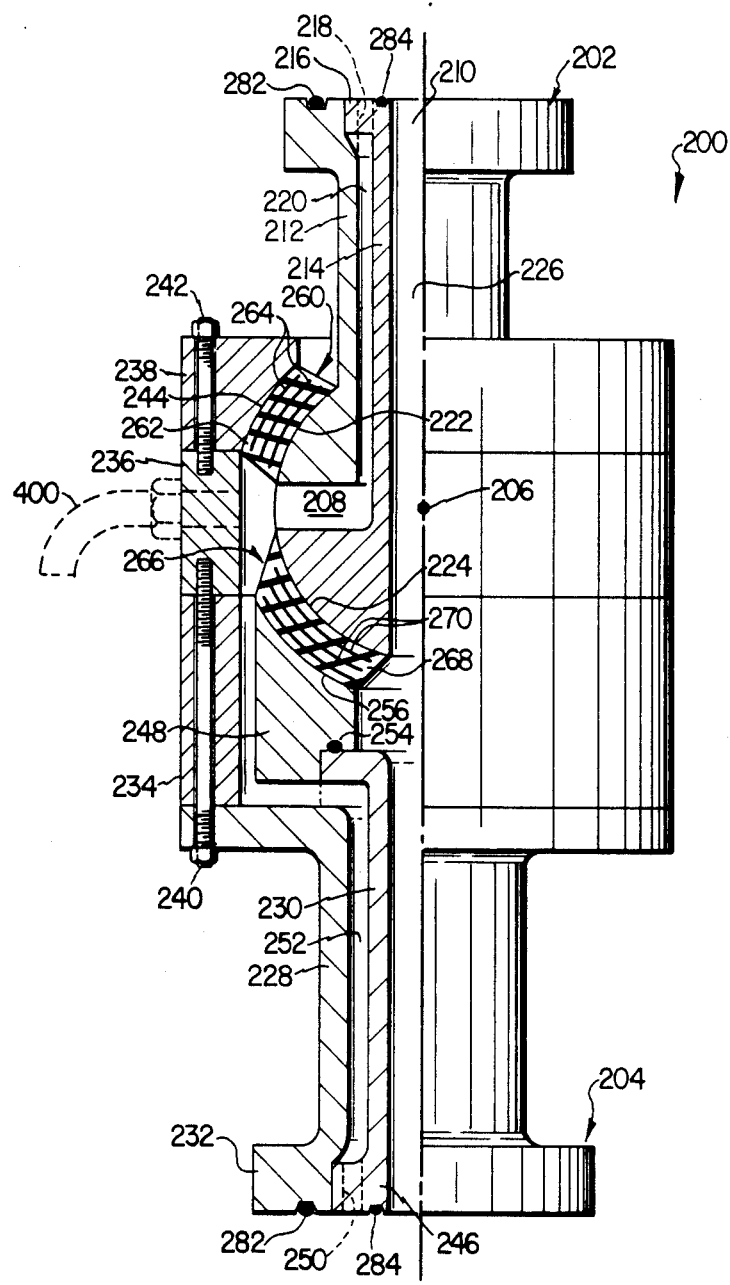
FIG. 3 is a partial cross-sectional view of a third embodiment of the present invention.

With reference now to FIG. 3, a third embodiment of the present invention is illustrated which forms a flex joint 200. The flex joint 200 is defined by a first flexible pipe connector 202 and a second flexible pipe connector 204 which are secured together by elastomeric material for pivotal motion relative to each other about a pivot point 206. A first continuous passage 208 and a second continuous passage 210 are formed through the flex joint 200 for carrying fluids and the like.

The first rigid pipe connector 202 is formed from an outer member 212 and an inner member 214. Inner member 214 is formed with an integral ring 216 which positions the members concentric with each other about their axis of symmetry. Ring 216 has a passage 218 therethrough which opens into the annular passage 220 formed between the members. Passages 218 and 220 form a portion of the continuous passage 208. Outer member 212 defines an outer spherical surface 222 and inner member 214 defines an outer spherical surface 224. A passage 226 formed through inner member 214 defines a portion of the continuous passage 210.

The second rigid pipe connector 204 includes an outer member 228 and an inner member 230. The outer member is formed of several sections, including sections 232, 234, 236 and 238. The sections can be assembled by the use of bolts 240 and 242. Sections 234 and 236 are essentially cylindrical sections. Section 238 has an inner spherical surface 244 which is centered on the pivot point 206 and faces the outer spherical surface 222. The section 232 is adapted for attachment to another pipe or element (not shown) at one end and has a radially outwardly extending section to which the remaining sections are bolted to provide sufficient room to receive portions of the first rigid pipe connector 202 within the interior of the outer member 228.

The inner member 230 is formed of two sections 246 and 248. Section 246 is slidably received within a portion of section 232 to maintain both members concentric about their axis of symmetry. Section 246 has passages 250 formed therethrough which open into the annular passage 252 between members 228 and 230. Passages 250 and annular passage 252 form a portion of the continuous passage 208. Section 248 mates with section 246 as shown and an 0-ring 254 is employed to seal the joint. The section 248 is provided with an inner spherical surface 256 which is centered on pivot point 206 and faces the outer spherical surface 224.

A first elastomeric assembly 260 is bonded between surfaces 244 and 222. The elastomeric assembly is constructed of alternating layers of elastomeric material 262 and rigid plates 264 with their center of curvature on the pivot point 206. A second elastomeric assembly 266 is similarly bonded between surface 224 and surface 256. Assembly 266 also is constructed of alternating layers of elastomeric material 262 and rigid plates 264.

As can be seen, the flex joint 200 will permit relative pivotal motion between the rigid pipe connectors 202 and 204 about the pivot point 206 by inducing shear forces in the elastomeric material 262. For the entire range of relative pivotal motion, the passages 208 and 210 remain essentially unrestricted in cross-section.

As can be seen, the flex joints described above provide for two continuous separate concentric fluid passages through the flex joint. These passages can be pressurized with fluid of any desired type. By using the flex joint as described above, a rigid pipe can be mounted to one connector and the other connector connected to the sea bed equipment. The pivotal motion allowed between the two connectors will provide the necessary freedom of motion between the sea floor and the surface platform without requiring the use of an expensive flexible pipe extending from the sea floor to the platform. Flex joints as disclosed in this detailed description can be expected to carry fluids within the passages at pressures as high as 10,000 psi.

Although the present invention has been described with respect to several embodiments thereof, various changes and modifications may be suggested to one skilled in the art, and it is intended that the present invention encompass such changes and modifications as fall within the scope of the appended claims.

We claim:

1. A flex joint for connecting a first member to a second member comprising:
   a first rigid pipe connector for rigid connection to the first member;
   a second rigid pipe connector for rigid connection to the second member;
   means having elastomeric elements deformable in shear to permit relative movement between the first and second rigid pipe connectors about a pivot point;
   each of said first and second rigid pipe connectors incorporating concentric inner and outer members, a first passage being formed in the annular space between said inner and outer members and a second passage being formed through the inner member, wherein the inner and outer members of said first rigid pipe connector each define an outer spherical surface, the inner and outer members of said second rigid pipe connector each defining an inner spherical surface facing one of said outer spherical surfaces, said elastomeric elements being bonded between facing spherical surfaces, each of said spherical surfaces being centered on the pivot point.

2. A flex joint for connecting a first member and a second member for relative pivotal motion about a pivot point, said flex joint comprising:
   a first rigid pipe connector including concentric outer and inner members, an annular space being formed between said outer and inner members to define a portion of a first passage and the inner member having a passage therethrough to define a portion of a second passage;
   a second rigid pipe connector including concentric inner and outer members, an annular space between said inner and outer members defining a portion of the first passage and a passage through the inner member defining a portion of the second passage; and
   a plurality of elastomeric bearing assemblies secured between said first and second rigid pipe connectors to permit relative pivotal motion about the pivot point by inducing elastomeric shear in the elastomeric assemblies, each of said elastomeric bearing assemblies comprising alternating layers of elastomeric material and rigid plates, each of said elastomeric bearing assemblies forming spherical sections of radius centered on the pivot point, the flex joint being capable of transferring both tension and compressive forces between the first and second members, the first and second passages through the flex joint remaining separate and continuous throughout the entire range of motion of the flex joint about the pivot point, at least one of said elastomeric bearing assemblies separating the first and second passages.

3. A flex joint for connecting a first member and a second member for relative pivotal motion about a pivot point, said flex joint comprising:
   a first rigid pipe connector including concentric outer and inner members, an annular space being formed between said outer and inner members to define a portion of a first passage and the inner member having a passage therethrough to define a portion of a second passage;
   a second rigid pipe connector including concentric inner and outer members, an annular space between said inner and outer members defining a portion of the first passage and a passage through the inner member defining a portion of the second passage;
   a plurality of elastomeric bearing assemblies positioned between said first and second rigid pipe connectors to permit relative pivotal motion about the pivot point by inducing elastomeric shear in the elastomeric assemblies, each of said elastomeric bearing assemblies comprising alternating layers of elastomeric material and rigid plates, each of said elastomeric bearing assemblies forming spherical sections of radius centered on the pivot point, the flex joint being capable of transferring both tension and compressive forces between the first and second members, the first and second passages through the flex joint remaining separate and continuous throughout the entire range of motion of the flex joint about the pivot point;

a cylinder extending about a section of said first and second rigid pipe connectors, said cylinder defining a pair of inner spherical surfaces;

the outer member of each of said pipe connectors defining and outer spherical surface facing one of the inner spherical surfaces on said cylinder;

an elastomeric bearing assembly being bonded between each facing pair of surfaces, each of said surfaces being centered on the pivot axis.

4. A flex joint for connecting a first member and a second member for relative pivotal motion about a pivot point, said flex joint comprising:

a first rigid pipe connector including concentric outer and inner members, an annular space being formed between said outer and inner members to define a portion of a first passage and the inner member having a passage therethrough to define a portion of a second passage;

a second rigid pipe connector including concentric inner and outer members, an annular space between said inner and outer members defining a portion of the first passage and a passage through the inner member defining a portion of the second passage;

a plurality of elastomeric bearing assemblies positioned between said first and second rigid pipe connectors to permit relative pivotal motion about the pivot point by inducing elastomeric shear in the elastomeric assemblies, each of said elastomeric bearing assemblies comprising alternating layers of elastomeric material and rigid plates, each of said elastomeric bearing assemblies forming spherical sections of radius centered on the pivot point, the flex joint being capable of transferring both tension and compressive forces between the first and second members, the first and second passages through the flex joint remaining separate and continuous throughout the entire range of motion of flex joint about the pivot point;

a ball having a spherical exterior surface and a passage therethrough for connecting the passages within the inner members, each of said inner members defining an inner spherical surface facing a portion of the outer spherical surface of the ball, an elastomeric bearing assembly being bonded between each of the facing surfaces, each of said surfaces being centered on a pivot point.

5. A flex joint for connecting a first member and a second member for relative pivotal motion about a pivot point, said flex joint comprising:

a first rigid pipe connector including concentric outer and inner members, an annular space being formed between said outer and inner members to define a portion of a first passage and the inner member having a passage therethrough to define a portion of a second passage;

a second rigid pipe connector including concentric inner and outer members, an annular space between said inner and outer members defining a portion of the first passage, and a passage through the inner member defining a portion of the second passage;

a plurality of elastomeric bearing assemblies positioned between said first and second rigid pipe connectors to permit relative pivotal motion about the pivot point by inducing elastomeric shear in the elastomeric assemblies, each of said elastomeric bearing assemblies comprising alternating layers of elastomeric material and rigid plates, each of said elastomeric bearing assemblies forming spherical sections of radius centered on the pivot point, the flex joint being capable of transferring both tension and compressive forces between the first and second members, the first and second passages through the flex joint remaining separate and continuous throughout the entire range of motion of the flex joint about the pivot point;

the inner and outer members of said second rigid pipe connector each defining an inner spherical surface, and the inner and outer members of said first rigid pipe connector each defining an outer spherical surface each outer spherical surface facing an inner spherical surface of said second rigid pipe connector, one of said elastomeric bearing assemblies being bonded between facing spherical surfaces, each of said spherical surfaces being concentric with the pivot point.

* * * * *